A. TSCHERNE.
MACHINE FOR CUTTING EMBROIDERIES.
APPLICATION FILED SEPT. 13, 1911.
1,024,812.
Patented Apr. 30, 1912.
2 SHEETS—SHEET 1.
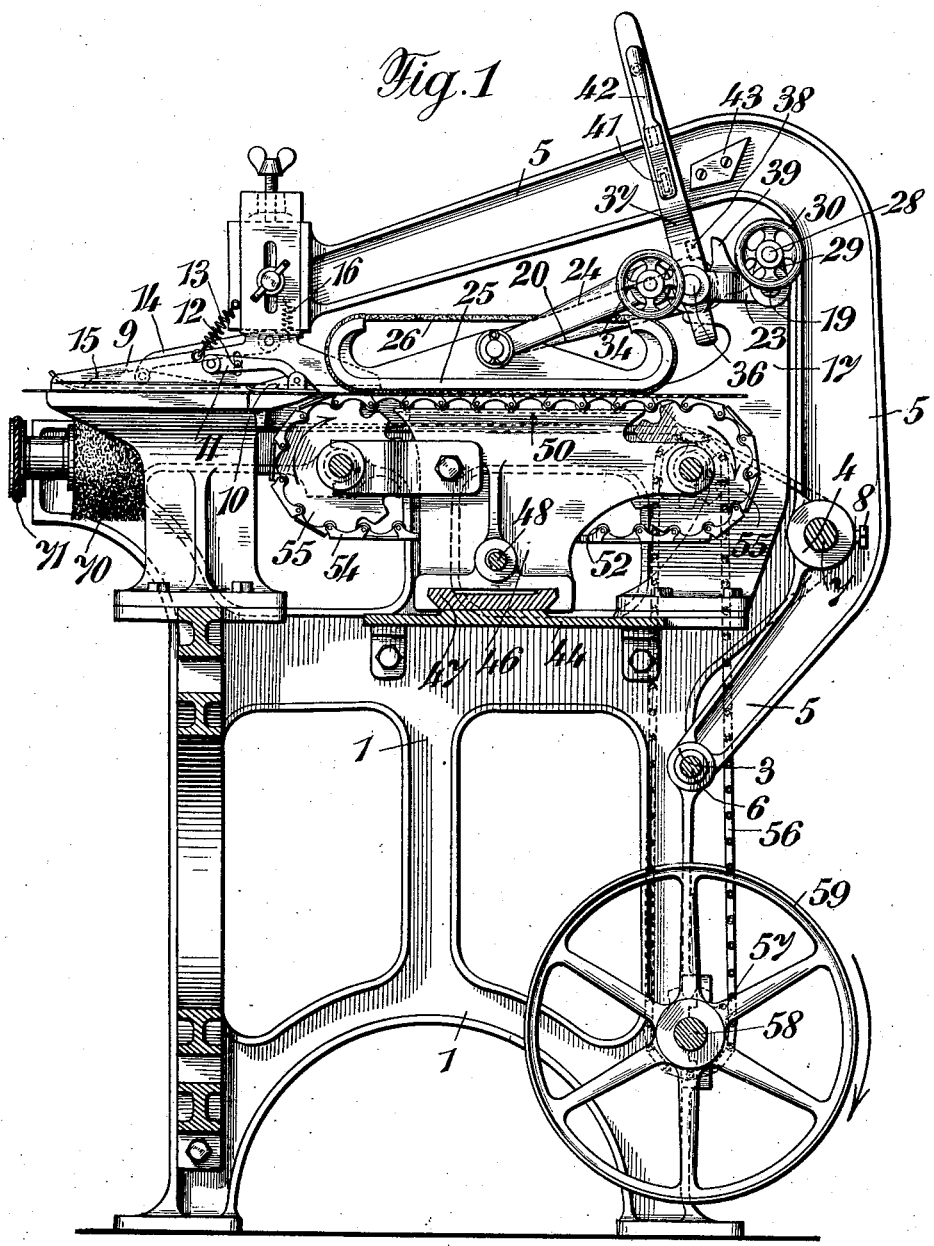

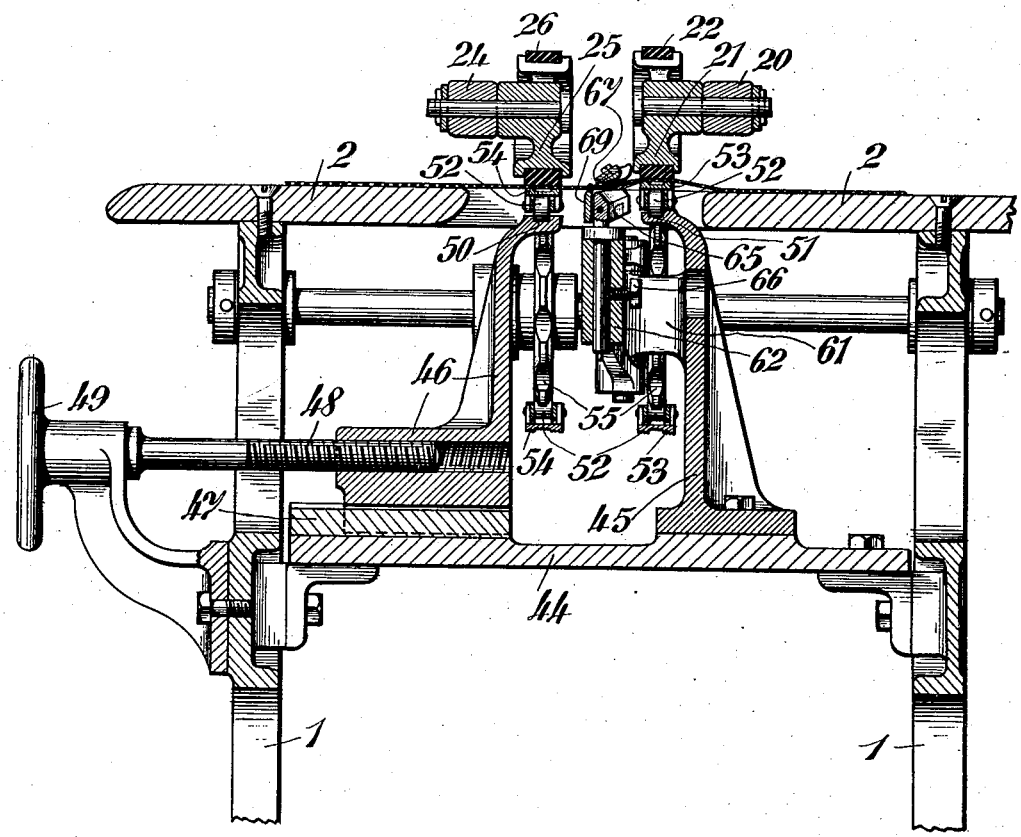

UNITED STATES PATENT OFFICE.

ALOIS TSCHERNE, OF RORSCHACH, SWITZERLAND, ASSIGNOR TO THE FIRM OF HENRI LEVY, OF RORSCHACH, SWITZERLAND.

MACHINE FOR CUTTING EMBROIDERIES.

1,024,812.  Specification of Letters Patent.  Patented Apr. 30, 1912.

Application filed September 13, 1911. Serial No. 649,071.

*To all whom it may concern:*

Be it known that I, ALOIS TSCHERNE, a subject of the Emperor of Austria-Hungary, residing at Rorschach, Hafenplatz, Switzerland, have invented new and useful Improvements in Machines for Cutting Embroideries; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a device for feeding the fabric to the knife of machines for cutting embroidery foundation. Both portions, the embroidered as well as the not-embroidered portion are seized by the feeding means and moved forward whereby the feeding means can be adjusted so that they act as fabric stretcher in the direction of the width of the material.

According to this invention two chains acting as said conveying and stretching means are arranged so, that the upper part of that chain which is located on the side of the back of the knife is guided higher than the other chain.

In the accompanying drawings Figure 1 shows in elevation and partly in section a machine for cutting embroideries provided with a device according to this invention. Fig. 2 is an elevation of parts of the machine in an enlarged scale.

The horizontal plate or table 2, which is shown only in Fig. 2 is mounted on the frame 1 of the machine. The arm 5 is slidably supported by bearings 3 and 4 on horizontal rods 6 and 7 and fixed to the latter by screws 8. The arm 5 projects over the table 2 and carries a vertically movable and fixable vertical guide plate 9, to which is pivoted on each side a lever 11. Studs of the lever 11 are free to turn in bearings of two horizontal clamping plates 10. Both the levers 11 are connected to each other by bolts 12 and actuated by a spring 13. A lever 14 is also rotatably supported by the guide plate 9 and carries a horizontal plate 15. A spring 16 acts on this lever. The bracket 17 secured to the frame 1 is provided with a bearing, by which an axle 19 is supported and prevented from moving in axial direction. The arm 20 secured to the axle 19 rotatably supports a pressing device consisting of a shoe 21, around which passes an endless apron 22 with roughened surface. A fork shaped support 23, to which is pivotally connected a lever 24 is slidably mounted on the axle 19. The lever 24 carries a second pressing device consisting of a shoe 25 around which passes an endless apron 26 also provided with a roughened surface. A screw spindle 28 engages a projection of the support 23. The spindle is immovable in axial direction and supported by a bearing 29 secured to the axle 19. A hand-wheel 30 is fixed to the spindle. The shoe 25 can be laterally displaced by turning the hand-wheel 30. The axle which connects the lever 24 to the support 23 carries a hand-wheel 34 and an adjustable ring to which is secured one end of a spring the other end of which presses against the lever 24. The axle is prevented by a set-screw from being turned by the spring. After the set-screw is loosened the tension of the spring can be adjusted by turning the hand-wheel. The arm 20 is connected to the support 23 by an axle 36. To the latter is secured a hand lever 37 provided with a nose 38 which engages a projection 39 of a part connecting the axles 36 and 19 to each other. By reversing the hand lever 37 both the shoes 21 and 25 can be lifted at the same time. A spring lever 42 with a nose 41 is mounted on the hand lever 37. For securing the shoes 21 and 25 in a raised position the nose 41 can be turned and fixed behind a stop 43 mounted on the arm 5.

A guide 47 is provided in a plate 44 mounted on the frame 1. A support 46 is movable in the guide 47 by means of a screw 48 with hand-wheel 49 while another support 45 is secured to the plate 44. Both the supports are provided on the top with grooves 50, 51 which are engaged by rollers 52 of chains 53, 54 with roughened surfaces conveying the fabric to be cut and acting as stretching means. The chains are located below the aprons 22 and 26.

According to this invention the groove 51 is located somewhat higher than the groove 50, so that the upper part of the chain 53, which is the one situated on the side of the back of the knife 67 is guided over a higher surface 51, than the upper part of the other chain 54 which is opposite the edge of the knife. The grooves 50 and 51, as well as the aprons 22 and 26 are not parallel to each other but diverge in the direction in which the fabric is to be moved. The conveying chains are mounted on chain wheels 55 and impelled from the main shaft 58 by a chain 56 and a chain wheel 57, to which motion may be imparted either by a pulley 59 or by a hand wheel.

A bearing 61 with vertical bore is fixed on the support 45 and holds a horizontally movable knife-carrier support 62, to the other end of which is secured a vertical stud. This stud is free to slide in a guide fixed to the movable support 46. A knife-carrier 65 is secured to the support 62 by screw 66. A knife 67 is rigidly connected to the knife-carrier 65, to which is pivoted a bar 69 (Fig. 2). A spring presses the bar against the knife-carrier 65. A slot formed by the bar and the cutting edge of the knife allows only the non-embroidered portion of the fabric to pass. The horizontal knife 67 is arranged obliquely to the direction of the aprons 22, 26 and to the feeding means 53, 54 and is immovable during the cutting, so that the obliquity can exactly be adjusted.

The brush 70 to which motion is imparted by a rope drive 71 from the main shaft 58, moves the edge of the embroidery against the plate 9. The fabric is guided between the table 2 and the plate 9 as well as between the clamping plates 10 and 15 and fed between the aprons 22 and 25, between the conveying chains 53 and 54 and through the knife-carrier 65. By this means the fabric is cut along the edge of the embroidery.

What I claim is:

1. In a machine for cutting embroidery background along the edge of the embroidery, a knife, a pair of superposed endless bands movable in parallel horizontal planes at each side of the knife, adapted to feed the embroidery along the edge of the knife and to stretch the background in a direction perpendicular to its direction of travel, the bands at the back of the knife being higher than the bands opposite the edge of said knife.

2. In a machine for cutting embroidery background along the edge of the embroidery, a knife blade lying in substantially the plane of the background, two superposed endless bands movable in parallel horizontal planes at each side of the knife and adapted to feed the background in a straight line along the knife at an angle to the edge of the latter and to stretch the background in a direction perpendicular to its direction of travel, said bands diverging in the direction of their travel, the bands at the back of the knife being higher than the bands opposite the edge of said knife.

In testimony that I claim the foregoing as my invention, I have signed my name in presence of two subscribing witnesses.

ALOIS TSCHERNE.

Witnesses:
EUGENE WEBER,
ALBERT H. PHILLIPS.

Copies of this patent may be obtained for five cents each, by addressing the "Commissioner of Patents Washington, D. C."